United States Patent [19]
Weber

[11] 3,976,084
[45] Aug. 24, 1976

[54] RETHRESHER BLOWER FOR A COMBINE
[75] Inventor: Wilbert D. Weber, Mississauga, Canada
[73] Assignee: Massey-Ferguson Industries Limited, Toronto, Canada
[22] Filed: Apr. 23, 1975
[21] Appl. No.: 570,901

[52] U.S. Cl. .................................. 130/27 F; 56/14.6
[51] Int. Cl.² ........................................... A01F 12/18
[58] Field of Search ............ 130/27 F, 27 G, 27 HA, 130/27 R; 56/14.4, 14.5, 14.6

[56] References Cited
UNITED STATES PATENTS

| 551,500 | 12/1895 | Landis | 130/27 F |
| 886,707 | 5/1908 | Landis | 130/27 F |
| 1,771,359 | 7/1930 | Taylor | 56/14.4 |
| 2,202,760 | 5/1940 | Fank | 130/27 F |
| 2,875,768 | 3/1959 | Belkowski et al. | 130/27 F |
| 3,115,142 | 12/1963 | Kepkay | 130/27 F |
| 3,247,855 | 4/1966 | Kepkay | 130/27 F |

FOREIGN PATENTS OR APPLICATIONS

| 22,976 | 4/1962 | Germany | 130/27 F |

Primary Examiner—Russell R. Kinsey
Attorney, Agent, or Firm—Robert L. Farris

[57] ABSTRACT

A rethresher and conveyor for combines in which a rotary blower is positioned to receive tailings from a combine and in which a blower is provided with threshing elements coacting with stationary elements to rethresh the tailings. The rethreshed tailings are entrained in the air stream formed by the blower and conveyed from the rethreshing assembly through duct work to the combine for reprocessing.

4 Claims, 7 Drawing Figures

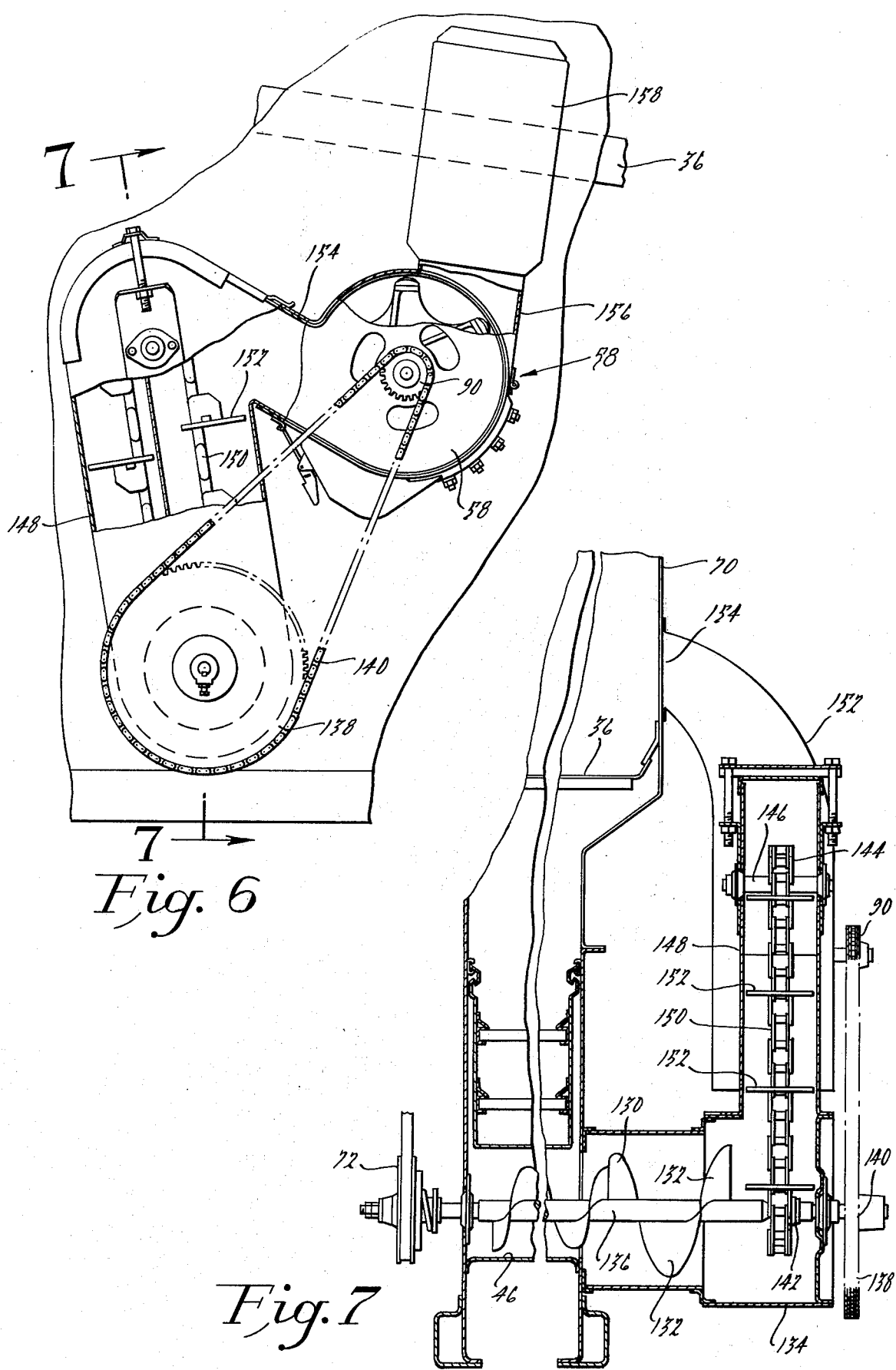

RETHRESHER BLOWER FOR A COMBINE

BACKGROUND OF THE INVENTION

This invention relates to combines and more particularly to a rethreshing conveying apparatus for reprocessing tailings and returning them to the combine.

Rethreshing units have been provided which are mounted to one side of the combine to receive tailings overflowing the cleaning unit of the combine and thereafter, conveying the rethreshed material back to the combine for reprocessing through the cleaning unit. In such arrangements, conveyors must be provided to move the tailings to the rethreshing unit and from the rethreshing unit to the combine. These conveyors are usually augers or chain conveyors which are subject to jamming and breakage, are expensive, and require additional driving arrangements and power from the already heavily laden driving system of the combine.

SUMMARY OF THE INVENTION

It is an object of the invention to provide a rethresher and conveyor assembly in which a blower and its housing are provided with rethreshing elements for rethreshing tailings and in which air from the blower entrains the rethreshed material and conveys it through duct work back to the combine without requiring additional conveyors.

It is another object of the invention to provide a rethresher and conveyor assembly employing a rotary blower which has threshing elements cooperating with stationary elements to move not only air but also the tailings so that the rethreshed tailings are entrained in the air and conveyed to an elevated position in the combine for reprocessing.

A rethresher conveyor apparatus is provided in which the rethreshing unit is in the form of a rotatable blower having vanes, the outer ends of which are provided with threshing elements coacting with stationary threshing elements. The threshing elements rethresh the grain and the vanes of the blower serve to move air from an air intake to a material outlet so that the rethreshed tailings become entrained in the stream of air and are delivered through duct work to the combine for reprocessing.

DESCRIPTION OF THE DRAWINGS

FIG. 6 is a view similar to FIG. 2 with parts broken away and removed and showing a modified form of the invention; and FIG. 7 is a sectional view taken on line 7—7 in FIG. 6.

DETAILED DESCRIPTION

Figure 1:
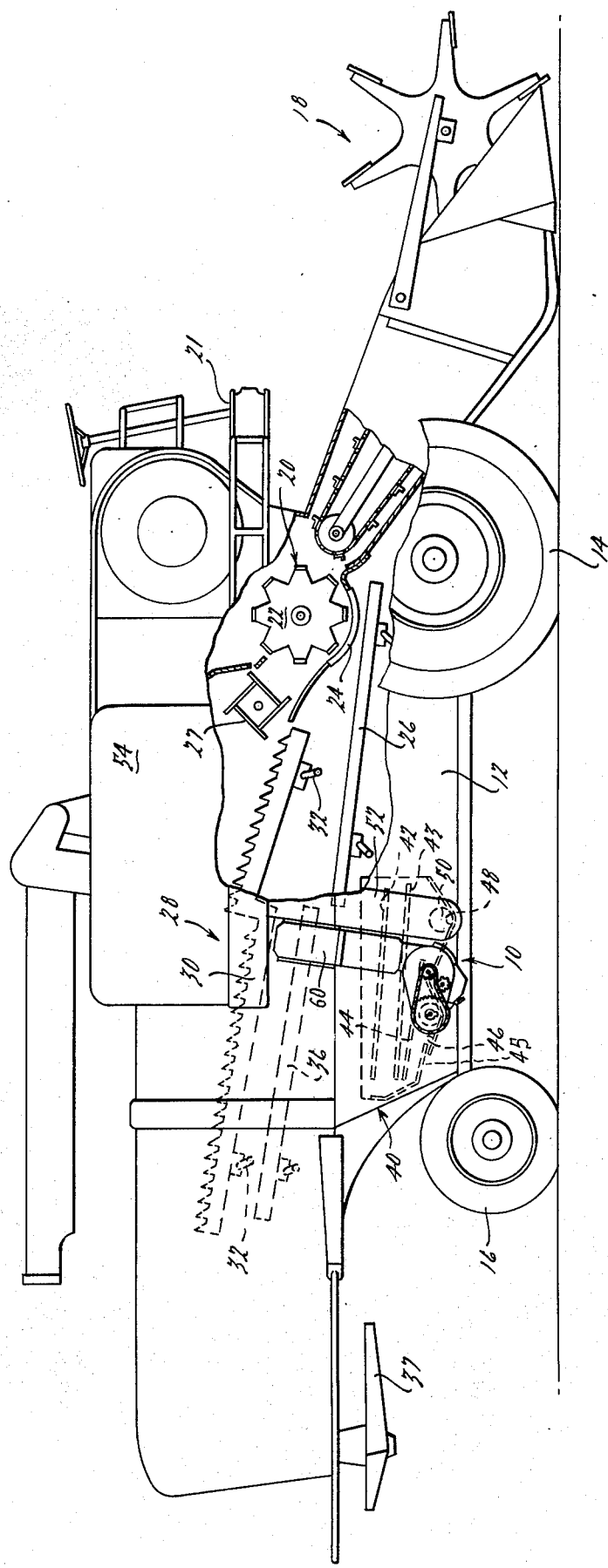
FIG. 1 is a side elevation with parts broken away and removed and showing a rethresher conveyor assembly embodying the present invention.

Referring to FIG. 1, a combine is shown having a rethreshing and conveying apparatus indicated generally at 10 and embodying the invention. The rethreshing and conveying apparatus 10 is mounted on a main body 12 which is supported relative to the ground by front driving wheels 14 and rear steering wheels 16. A header assembly 18 is carried at the forward end of the combine for cutting crop and conveying it upwardly and rearwardly to a threshing apparatus 20 enclosed in the body 12 of the combine. An operator's platform 21 is disposed at the front of the combine to over-look the header assembly 18.

The threshing apparatus includes a cylinder unit 22 which cooperates with a concave 24 to thresh grain from the incoming crop material received from the header assembly 18. A majority of the grain is separated from the remainder of the crop material and the grain drops through openings in the concave 24 onto a reciprocating grain pan 26 which conveys the grain for further processing. The remainder of the crop material, which is a mixture of grain and plant stems or straw, is conveyed rearwardly of the machine by a rotating beater 27 to a separating section indicated at 28.

The separating section 28 includes longitudinally extending and transversely spaced straw walkers 30 which are mounted on rotating cranks 32 to agitate the mixture of straw and grain so that the grain separates from the straw and drops between the walkers to the forward grain pan 26 and to a rearward grain pan 36. This grain is conveyed by the grain pans 26 and 36 for further processing in the combine and the straw remains on top of the straw walkers 30 and is moved rearwardly of the combine for discharge to a rotating straw spreader 37 which spreads the straw over the ground at the rear of the combine.

The grain collecting pans 26 and 36 receive a mixture of grain, chaff, incompletely threshed heads of grain and smaller bits of refuse material and straw which drops between straw walkers 30. This material is conveyed forwardly by the rear grain pan 36 and rearwardly by the forward grain pan 26 to a shaker shoe assembly 40 which receives the material for cleaning. The shaker shoe assembly has a plurality of sieves 42 and 43 which provide a cascade effect to the material deposited on the upper sieve 42. In operation, a fan (not shown) directs air rearwardly past the sieves and serves to blow lighter chaff and bits of refuse material from the mixture remaining on top of the sieves and moves the refuse material through the open back of the combine. The heavier material called "tailings" and consisting of incompletely threshed heads of grain, green seeds and heavier chaff will remain on top of the sieves 42 and 43 and overflow and fall to the bottom 45 of the shaker shoe assembly and find its way into a tailings trough 46. The clean grain will drop through the sieves onto the pan 44 which conveys it into a trough 48 or it falls directly into the trough 48 and an auger 50 which moves the clean grain by way of an elevator 52 to a grain storage tank 54 for temporary storage.

The rethreshing and conveying apparatus 10 embodying the invention includes a rethreshing assembly 56 which receives tailings from the trough 46 and rethreshes the tailings and conveys the rethreshed grain, chaff and other material upwardly in a conveying apparatus 60 to the grain collecting pan 36 from which it is returned through the shaker shoe assembly 40 for reprocessing therein.

Figures 2, 3:
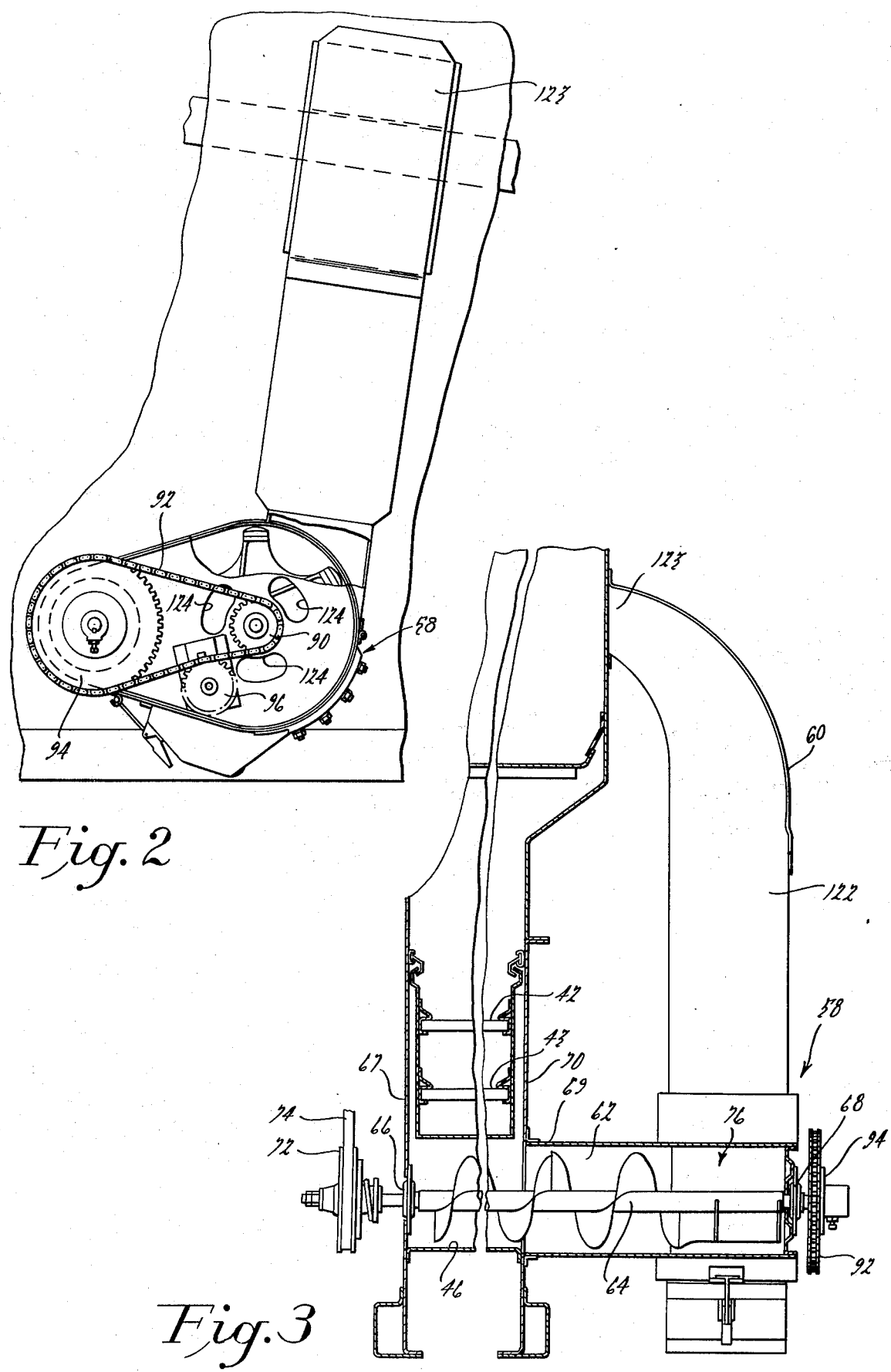
FIG. 2 in an enlarged side view of the rethresher and conveyor assembly shown in FIG. 1.
FIG. 3 is a sectional view taken on line 3—3 in FIG. 2.

Referring now to FIG. 3, the tailings trough 46 contains an auger 62 having a shaft 64 one end of which is journaled in a bearing 66 mounted on a side wall 67 and a bearing 68 supported in the end of an extending housing 69 projecting from the side wall 70. The auger 62 is driven to move tailings in the trough to the right as viewed in FIG. 3 by a pulley 72 keyed to the auger shaft 64 and driven by a belt 74 from the main drive of the combine. The tailings which are conveyed to the right end of the auger, are conveyed to the rethreshing assembly 58.

The rethreshing assembly 58 is disposed in a housing 76 which as seen in FIG. 3, is in spaced relationship to the outer wall 70 of the combine. The housing 76 communicates with the end of the extension housing 69 for the auger and as seen in FIG. 4 has an arcuate forward wall 77, an arcuate rearward wall 78 and diverging top and bottom walls 79 and 80, respectively.

Figure 5:
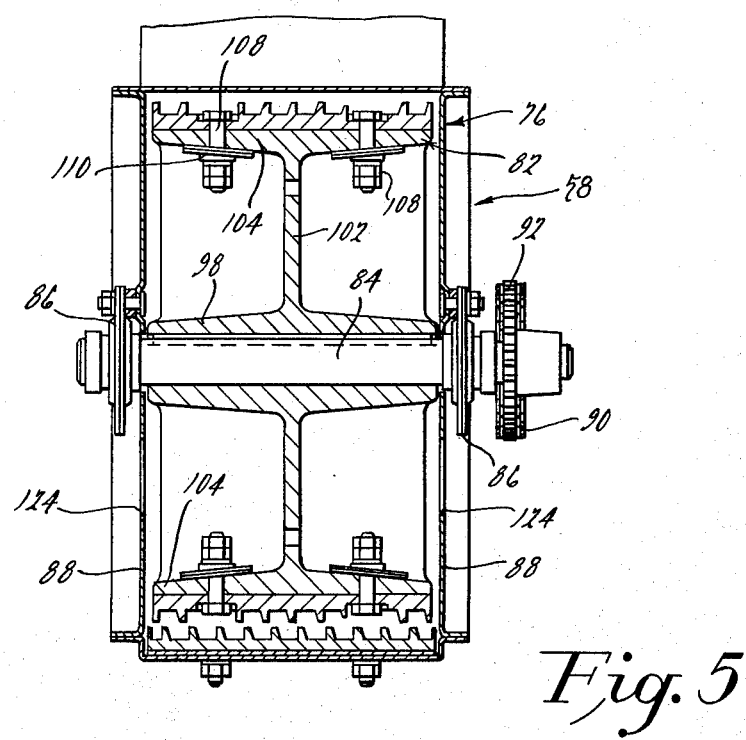
FIG. 5 is a sectional view of the rethresher assembly taken on line 5—5 in FIG. 4.

A rotor 82 is supported within the housing and includes a shaft 84 which as seen in FIG. 5 is journaled in spaced bearings 86 mounted on side walls 88 of the housing 76. The outer end of the shaft 84 is provided with a sprocket 90 which is drivingly connected by means of a chain 92 to a sprocket 94 seen in FIG. 2 and keyed on the end of the auger shaft 64. An idler sprocket 96 is adjustably mounted on the side wall 70 of the housing to maintain the chain in tension and engaged with the sprockets 90 and 94. Consequently, rotation of the auger 62 by means of the drive pulley 72 serves to rotate the rotor 82.

Figure 4:
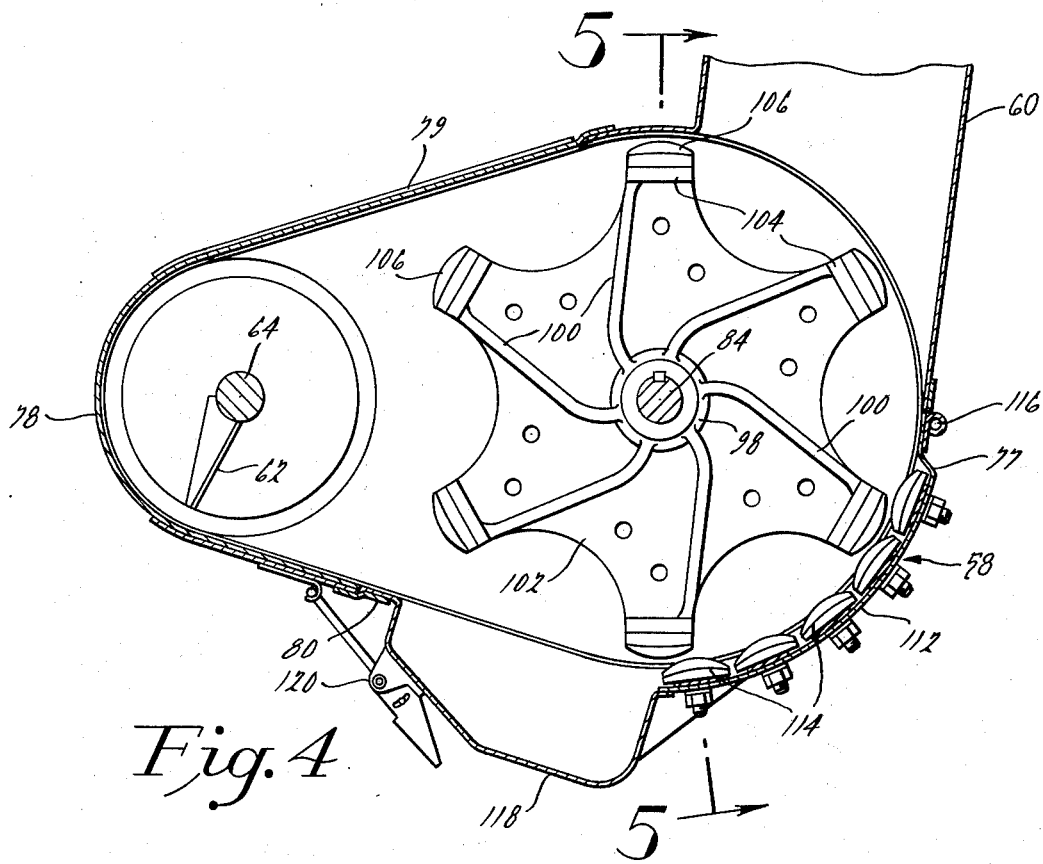
FIG. 4 is a sectional view at a further enlarged scale of the rethresher assembly.

Referring now to FIGS. 4 and 5, the rotor 82 includes a hub portion 98 from which a plurality of vanes 100 extend generally radially. The vanes 100 have a width substantially equal to the width of the housing within the walls 88 and merge with a central web 102. The outer ends of each of the vanes has a flange portion 104 which detachably supports a rasp bar 106. Each of the rasp bars 106 is connected to its associated flange 104 by means of bolts 108 which also are used to support selected numbers of washer like counter-balancing weights 110 by which the rotor may be accurately balanced.

The forward wall of the housing 76 includes an arcuate wall section 112 which is concentric with the shaft 84. The arcuate wall section 112 supports a plurality of transversely extending rasp bars 114 which are bolted to the section 112 in closely spaced relationship to the rasp bars at the tips of the vanes 100. The arcuate wall section 112 is hinged as indicated at 116. A rearward portion of the arcuate wall 112 is provided with a rock catcher 118 which forms a cavity in the lower portion of the housing 76. The cavity serves to receive and retain hard objects such as stones and to prevent their being conveyed between the rasp bars 106 and 114. A latch mechanism 120 is provided at the rear of the stone catcher 118 by which the stone catcher and the arcuate wall section may be pivoted as a unit about the hinge pin 116 for the purpose of removing material from the cavity and also for the purpose of removing or replacing rasp bars 114 on the arcuate section 112.

The forward upper portion of the housing 76 communicates with a duct 122 which as seen in FIGS. 2 and 3, extends generally upwardly of the combine and has an outlet end portion 123 above the rearward grain pan 36.

The side walls 88 of the housing 76 are provided with air inlet opeings 124 which admit air to the rotor chamber at locations intermediate the hub 98 and flanges 104.

In operation, tailings are conveyed by the auger 50 in the trough 46 to the right end of the auger as viewed in FIG. 3, and the rotor 82 which is rotating in a counterclockwise direction as viewed in FIG. 4, serves to move the tailings so that they are conveyed between the rasp bars 106 at the tips of the vanes 100 and the rasp bars 114 on the arcuate wall section 112. The vanes 100 act as blower blades so that tailings and rethreshed grain becomes entrained in the air entering the openings 124. The air and entrained material is directed upwardly through the duct 122 and the rethreshed material is discharged transversely of the rear grain pan 36. This material is conveyed to the shaker shoe assembly 40 for reprocessing in a manner previously described.

Referring now to FIGS. 6 and 7, a modification of the invention is shown in which the rethreshing assembly 58 is disposed in elevated position relative to the bottom of the tailings trough 46. An auger 130 has a portion disposed in the tailings trough 46 and an enlarged portion 132 disposed in a tubular extension housing 133 which acts to convey tailings to the elevator housing 134. The auger 130 has a shaft 136, the opposite ends of which are provided with driven pulley 72, as in the prior embodiment, for rotation of the auger 130. The opposite end of the shaft 136 is provided with a sprocket 138 connected by a chain 140 to the sprocket 90 of the rethreshing assembly 90 for operating the latter. An intermediate portion of the shaft 136 disposed within the housing 134 is provided with a sprocket 142. Another sprocket 144 is mounted to rotate with a shaft 146 in the upper end of the conveyor housing 148. A conveyer chain 150 supporting conveying paddles 152 is trained over the sprockets 142 and 144. Upon rotation of the auger 130, tailings are conveyed to the right as viewed in FIG. 7 and the paddles 152 engage the material and carry it upwardly within the housing 148. The upper end of the housing 148 communicates by way of a duct portion 154 with the rethreshing assembly 58 so that tailings conveyed by the paddles 152 are discharged into the rethreshing assembly 58. The rethreshing assembly rethreshes the tailings and forms a stream of air conveying the rethreshed material upwardly in a duct 156 having a discharge end 158 opening through the side wall 70 above the rear grain pan 36. In this instance, the duct 156 is shorter than in the prior disclosed embodiment of the invention and has particular utility when large volumes of tailings are being processed and which might otherwise be difficult to transport by means of air. Moreover, the shorter duct 156 makes it possible to discharge the rethreshed material a greater distance transversely of the grain pan 36.

A rethresher and conveyor for combines has been provided in which a rotary blower is positioned to receive tailings from a combine and in which the blower is provided with threshing elements coacting with stationary elements on the blower housing. The blower acts not only to rethresh tailings, but also to form a stream of air for conveying the rethreshed tailings entrained in an air stream back to the combine for reprocessing. In one embodiment of the invention the blower is positioned adjacent to a cleaning unit in the combine to receive tailings and forms a stream of air capable of moving the rethreshed tailings to an elevated position in the combine. In another embodiment of the invention the blower is supported at an elevated position relative to the cleaning unit of the combine to receive tailings through means of an elevating conveyor so that after the tailings are rethreshed and entrained in the stream of air from the blower, they need to be elevated only a short distance, leaving an air stream of greater force to dispatch the rethreshed tailings laterally in the combine.

The embodiments of the invention in which an exclusive property or privilege is claimed are defined as follows:

1. An agricultural combine harvester including a frame; a thresher housing; grain threshing, separating and cleaning apparatus including sieves mounted on the frame in the thresher housing; a conveyor mounted below said sieves for receiving tailings that overflow the sieves and conveying the tailings to one side of the combine; and a tailings rethreshing and blower assembly mounted on the frame for receiving tailings from the conveyor mounted below the sieves, for rethreshing the tailings and for blowing the rethreshed tailings back into the thresher housing for cleaning, the rethresher and blower assembly including a chamber defined by two end walls and arcuate wall sections joining the two end walls, a blower rotatably mounted between the two end walls, said blower including vanes extending outwardly from the axis of rotation of the blower, rasp bar sections detachably mounted on the outer ends of the blower vanes, stationary threshing elements mounted on at least a portion of the arcuate wall of the chamber to cooperate with the rasp bar sections on the blower vanes to rethresh tailings, a tailings inlet aperture in said arcuate wall sections, conveyor means connecting the conveyor mounted below the sieves and the tailings inlet aperture to direct tailings from conveyor mounted below said sieves through the tailings inlet aperture and into said chamber, a threshed tailings outlet in said arcuate wall sections, conveyor means connecting the threshed tailings outlet to the thresher housing to direct rethreshed tailings from the tailings outlet in said arcuate wall sections up and into the thresher housing, at least one air intake in one of the two end walls which define the chamber, and drive means to rotate the blower.

2. The agricultural combine harvester of claim 1 wherein the stationary threshing elements mounted on at least a portion of the arcuate wall of the chamber are rasp bar sections.

3. The agricultural combine harvester of claim 1 wherein the tailings rethreshing and blower assembly has at least one air intake aperture in each of the two end walls.

4. The agricultural combine harvester of claim 1 wherein the arcuate wall section of the chamber on which the stationary threshing elements are mounted is hinged relative to the two end walls for movement from a closed position to an open position giving access to said rasp bar sections.

* * * * *